(12) United States Patent
Ohara et al.

(10) Patent No.: US 7,983,402 B2
(45) Date of Patent: Jul. 19, 2011

(54) SYSTEM AND PROGRAM FOR CONTROLLING ELECTRONIC DEVICES

(75) Inventors: Kiyotaka Ohara, Aichi (JP); Satoshi Suzuki, Aichi (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 1273 days.

(21) Appl. No.: 11/499,763

(22) Filed: Aug. 7, 2006

(65) Prior Publication Data

US 2007/0124516 A1 May 31, 2007

(30) Foreign Application Priority Data

Aug. 5, 2005 (JP) ................................. 2005-228011

(51) Int. Cl.
*H04M 11/00* (2006.01)
(52) U.S. Cl. ............... 379/102.02; 379/100.12; 358/1.15
(58) Field of Classification Search ............. 379/102.02, 379/100.12, 93.02; 358/1.14, 1.15
See application file for complete search history.

(56) References Cited

U.S. PATENT DOCUMENTS

| 2002/0090089 A1 | 7/2002 | Branigan et al. |
| 2003/0145235 A1 | 7/2003 | Choo |
| 2004/0073784 A1 | 4/2004 | Ishidoshiro |
| 2006/0128360 A1* | 6/2006 | Hibino .......................... 455/411 |
| 2006/0256370 A1* | 11/2006 | Murakawa ................... 358/1.15 |

FOREIGN PATENT DOCUMENTS

| JP | 9-282112 | 10/1997 |
| JP | 11-85419 | 3/1999 |
| JP | 11-102148 A | 4/1999 |
| JP | 11-194913 | 7/1999 |
| JP | 2001-358848 | 12/2001 |
| JP | 2002-152446 | 5/2002 |
| JP | 2002-281045 | 9/2002 |
| JP | 2004-135055 | 4/2004 |
| JP | 2004-289302 A | 10/2004 |
| JP | 2004-530968 | 10/2004 |
| JP | 2005-7773 | 1/2005 |
| WO | WO 02/061553 A1 | 8/2002 |

OTHER PUBLICATIONS

Japanese Office Action, with English Translation, issued in Japanese Patent Application No. JP 2005-228011, dated Nov. 20, 2008.
Japanese Decision of Rejection, w/ English translation thereof, issued in Japanese Patent Application No. JP 2005-228011 dated Feb. 5, 2009.
Japanese Official Action dated Dec. 21, 2010 from JP application 2005-228011 together with English language translation.

* cited by examiner

*Primary Examiner* — Stella Woo
(74) *Attorney, Agent, or Firm* — Scully, Scott, Murphy & Presser, P.C.

(57) ABSTRACT

A controlling system for an electronic peripheral device is provided. The controlling system comprises an electronic peripheral device having a plurality of communication interfaces and a plurality of functions, at least one terminal device connectable to one of the communication interfaces of the electronic peripheral device via one of communication networks so that the terminal device can use one of the plurality of functions based on as to through which communication interface an instruction from the terminal device is received when the at least one of the plurality of functions is determined to be available, a function availability setting system, by which availability of at least one of the plurality of functions to the terminal device is set, and a function execution controlling system which controls execution of the at least one of the plurality of functions based on as to through which communication interface the instruction is received.

16 Claims, 14 Drawing Sheets

FIG.5A

Select Application to Use                                    270

Application              Maximum Allowable setting
                         Number of Sheets
Print ▽                  Unlimited
Scan
FAX                      Allowable color setting
Administration           Allow both

FIG.5B

Select Application to Use                                    270

Application              Maximum Allowable setting
                         Number of Sheets
Print ▽                  10
Scan
FAX                      Allowable color setting
Administration           Allow monochrome only

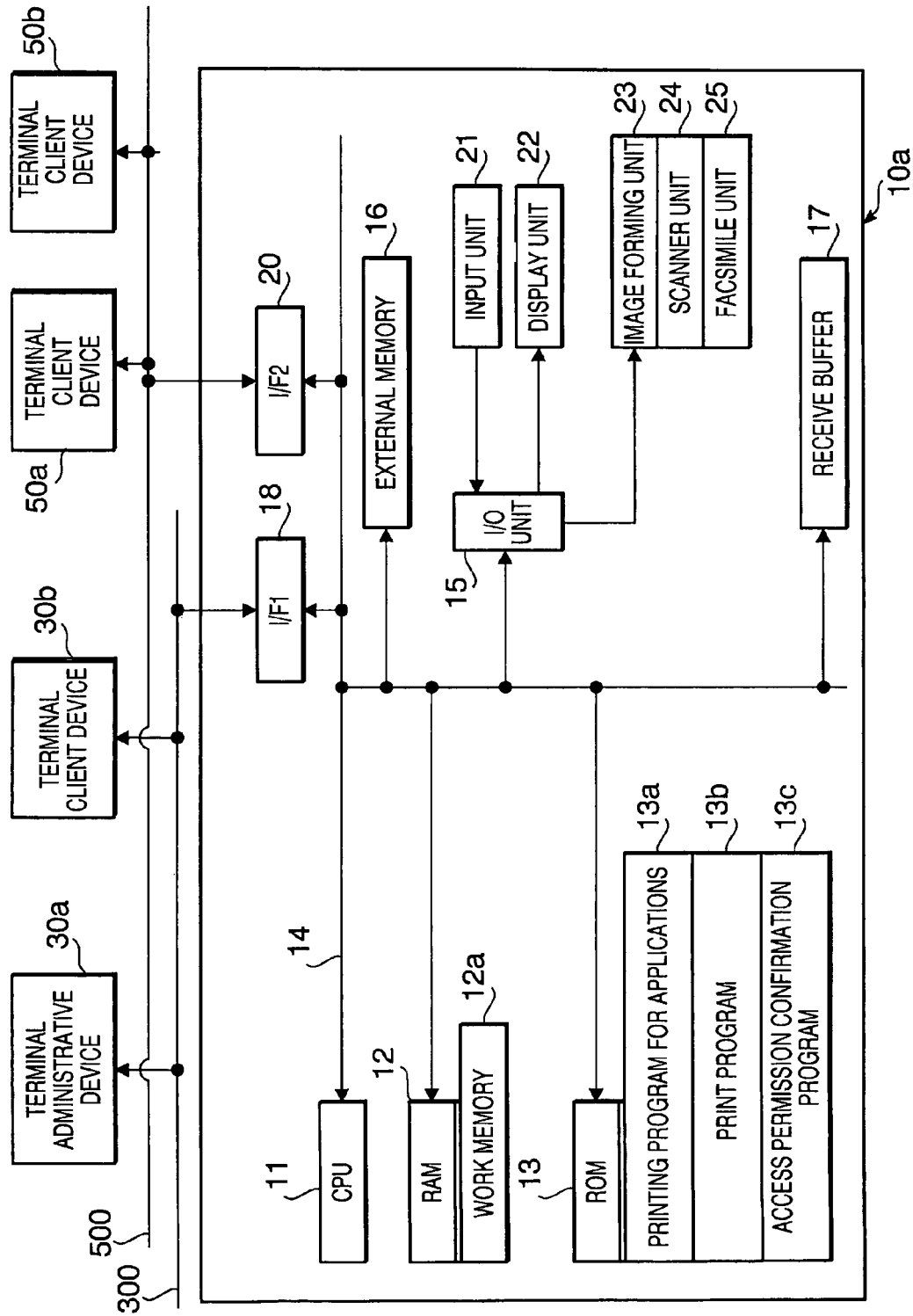

SYSTEM AND PROGRAM FOR CONTROLLING ELECTRONIC DEVICES

CROSS REFERENCE TO RELATED APPLICATION

This application claims priority from Japanese Patent Application No. 2005-228011, filed on Aug. 5, 2005, the entire subject matter of which is incorporated herein by reference.

TECHNICAL FIELD

The invention relates to a controlling system to control electronic devices such as a printing apparatus, a facsimile machine, a scanner device, and a copier, which are connected to a communication network via communication interfaces.

RELATED ART

In recent years, users of electronic devices such as a printer, a facsimile machine, a scanner device, a copier, and a multi-function peripheral having a plurality of functionalities that are connected to a communication network often need to limit availability of each of the devices to a specific user group so that only authorized users can use the devices. In Japanese Patent Provisional Publications Nos. 2002-152446 (hereinafter referred to as "the '466 publication") and 2001-358848 (hereinafter referred to as "the '848 publication"), for example, access control methods in which previously registered users are identified by inputting identifying information to devices so that availability of a functionality of the devices can be limited to specifically registered users are disclosed. In Japanese Patent Provisional Publications Nos. 2002-281045 (hereinafter referred to as "the '045 publication") and 2004-135055 (hereinafter referred to as "the '055 publication"), for example, other access control methods in which availabilities of devices are limited are disclosed. In these access control methods, users accessing via wireless access points provided in a wired network such as a LAN whereto peripheral devices are connected are identified by identification information such as a WEP (wired equivalent privacy) key so that accessibility to the devices are limited.

SUMMARY OF THE INVENTION

In view of the foregoing drawbacks, the present invention advantageously provides an electronic peripheral device controlling system for controlling function restriction which can easily regulate use of the electronic peripheral device, while ensuring the security on use of the electronic peripheral device. Further, a control program for the controlling system is provided.

BRIEF DESCRIPTION OF THE ACCOMPANYING DRAWINGS

FIGS. 5A and 5B show windows to be shown on a display unit of the terminal devices according to an embodiment of the invention.

FIG. 12 is a diagram to illustrate a variation of a controlling system according to an embodiment of the invention.

DETAILED DESCRIPTION OF THE INVENTION

Figure 1:
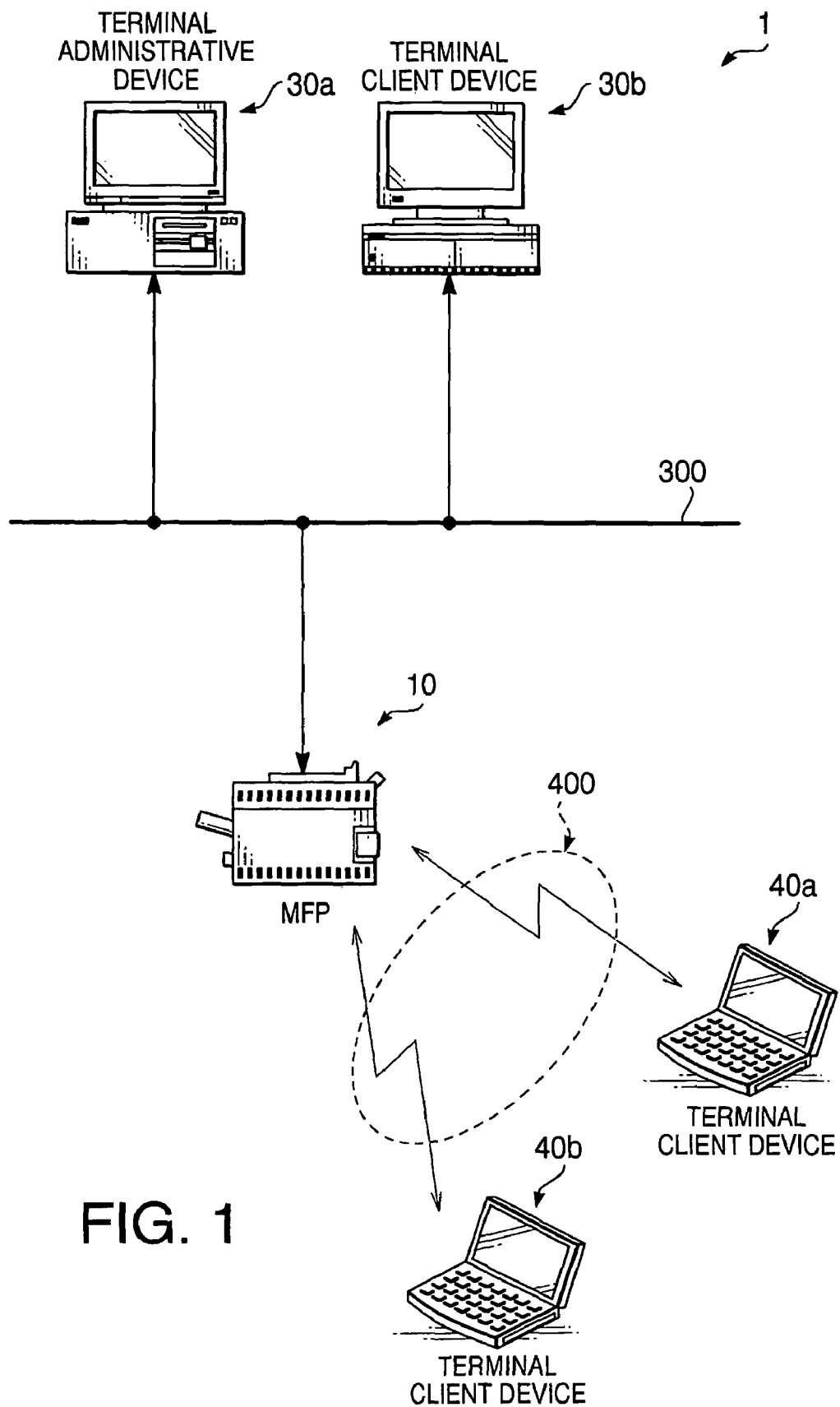
FIG. 1 illustrates a controlling system according to an embodiment of the invention.

The following describes general aspects of the invention comprised in various embodiments and modifications. It should be noted that various connections are set forth between elements in the following description. These connections are general and, unless specified otherwise, can be direct or indirect, and this specification is not intended to be limiting in this respect.

According to some aspects of the invention, there is provided a controlling system for an electronic peripheral device, comprising a n electronic peripheral device having a plurality of communication interfaces that are respectively connected with different communication networks, and having a plurality of functions, at least one terminal device connectable to one of the communication interfaces of the electronic peripheral device via one of the communication networks so that the terminal device can use at least one of the plurality of functions based on as to through which communication interface an instruction from the terminal device is received when the at least one of the plurality of functions is determined to be available, a function availability setting system, by which availability of at least one of the plurality of functions to the terminal device is set, a function execution controlling system which controls execution of the at least one of the plurality of functions based on as to through which communication interface the instruction is received so that the availability of the at least one of the plurality of functions set by the function availability setting system is applied to the terminal device that issued the instruction.

According to the above configuration of the controlling system with the electronic peripheral device having the plurality of communication interfaces, users of the controlling system can be grouped (for example, into a group of users inside an organization and a group of visiting users) based on the communication interfaces through which the electronic device is connected to the communication networks for various purposes such as security management without providing additional hardware such as wireless access points and hubs to the communication networks. Further, as the availability of the function to the terminal device is applied to the terminal device based on the communication interface through which the instruction is received, usage of the function can be easily managed on a user group basis. Furthermore, as users with different limitation levels are allowed to access the electronic peripheral device via different communication interfaces, it becomes less possible for a user with lower accessibility to improperly obtain identification information of a user with higher accessibility inadmissibly, so that security of the controlling system can be improved.

According to some aspects of the invention, there is provided a computer usable medium comprising computer readable instructions for controlling an electronic peripheral device having a plurality of communication interfaces that are respectively connected with different communication networks and having a plurality of functions and at least one terminal device connectable to one of the communication interfaces of the electronic peripheral device via one of the communication networks so that the terminal device can use at least one of the plurality of functions based on as to through which communication interface an instruction from the terminal device is received when the at least one of the plurality of functions is determined to be available. The computer program product controls the electronic peripheral device to execute the steps of function availability setting, wherein availability of at least one of the plurality of functions to the terminal device being connectable with the at least one of the plurality of communication interfaces is set, function execution control, wherein execution of the at least one of the plurality of functions is controlled based on as to through which communication interface the instruction is received so that the availability of the at least one of the plurality of functions set by the function availability setting system is applied to the terminal device that issued the instruction.

According to the above configuration of the computer program product, the controlling system of the present invention can be achieved by installing the computer program product in the terminal device.

With the above configuration, for example, a communication interface that is connected to a first network available to users with lower accessibility such as a visiting user can be applied with strict limitations, while a communication interface that is connected to a second network available to users with higher accessibility such as a user inside an organization can be applied with less limitations, so that the user inside the organization can access the function of the electronic device without requiring an authentication using a user name and a password. As the users can be grouped based on the communication interfaces that each communication network is connected to, the availability of the electronic peripheral device can be set on a communication interface basis. With this setting method, user setting process of an administrator can be simplified as the availability of the electronic peripheral device should not be necessarily set on an individual user basis. Further, as each of the communication interfaces is configured to be hardware physically independent from each other in one electronic peripheral device, the instruction from each communication network is received independently, and thus advantages regarding security can be achieved.

It should be noted that the plurality of communication interfaces are not necessarily applied to limit the availability. For example, the function of the electronic peripheral device may be fully available to a terminal device connected to one of the communication interfaces with no limitation of the availability.

Optionally, the function availability setting system can allow the at least one of the plurality of functions be accessed by the at least one of the plurality of communication interfaces and used by the terminal device while the remainder of the plurality of functions is restricted from being accessed and used.

According to the above configuration, one of the plurality of functions of the electronic peripheral device may be configured to be available, while the remaining functions may be set unavailable on a communication interface basis. Therefore, availability of a plurality of the functions as a unit can be configured on an individual communication interface. Further, for example, when the electronic peripheral device is a printing apparatus, functions in a same unit such as a maximum allowable number of printing sheets and a limitation on a printing mode (for example, monochrome printing is configured to be available while colored printing is configured to be limited) can be configured to be uniformly available so that the limitation level of the functions in the unit can be distinguished from other functions in other units.

Optionally, the function availability setting system can comprise a function availability configuration storage system, which stores information to specify the at least one of the plurality of functions to be allowed to the at least one of the plurality of communication interfaces as function availability configuration information. The function execution controlling system may determine the at least one of the plurality of communication interfaces through which the instruction from the terminal device is received and reads the function availability configuration information corresponding to the at least one of the plurality of communication interfaces determined from the function availability configuration storage system to specify the at least one of the plurality of functions to be allowed to the at least one of the plurality of communication interfaces.

According to the above configuration, the once configured function availability configuration information is stored in the function availability configuration storage system. Therefore, when the same function is used later, the same availability of the function can be applied to the same communication interface by using the function availability configuration information. Further, the once configured availability can be modified by overwriting the function availability configuration information stored in the function availability configuration storage system. It should be noted that the information to specify the at least one of the plurality of functions to be allowed to the at least one of the plurality of communication interfaces may refer to information that technically specifies an available function or may refer to information that specifies an unavailable function while the remaining functions with no availability limitation are specified as available functions.

Optionally, the function availability setting system can comprise a communication interface selecting system to select the at least one of the plurality of communication interfaces of the terminal device to which the availability of the at least one of the plurality of functions is applied, a limited function selecting system to select at least one of the plurality of functions to be limited, and a storage controlling system to control identifying information of the at least one of the plurality of communication interfaces selected by the communication interface selecting system and identifying information of the at least one of the plurality of functions selected by the limited function selecting system by storing the two pieces of information associated with each other.

According to the above configuration, as the availability of the functions to the terminal device is configured on a communication interface basis, the communication interface and the function to be limited are selected so that the availability is configured. When the information on the configuration is stored in the function availability configuration storage system, the selected communication interface and the function being associated with each other are further associated with the specific availability. With this configuration, when the instruction from the terminal device is received by the electric peripheral device, specific availability on a function basis can be configured based on the instruction and the communication interface being used for receiving the instruction.

Optionally, the controlling system can further comprise an authentication system which authenticates a user of the at least one of the plurality of functions before the at least one of the plurality of functions determined to be available by the function availability setting system is used. The function availability setting system is capable of setting the availability of the at least one of the plurality of functions individually on a user basis.

According to the above configuration, it is possible to require the user to be authenticated by a user name and a password before the function is used by the user so that security of the controlling system can be improved.

With the above configuration, availability of the function can be configured on a user basis when an authentication of the users is required. For example, availability levels for visiting users may be configured to be different based on significance of the users (for example, between a valued customer and a new customer) so that the availability of the functions can be limited by different limitation levels.

Optionally, the function availability setting system can comprise an authentication requirement setting system, by which whether the authentication is required is set individually on a function basis when the at least one of the plurality of functions is selected to be limited by a limited function selecting system.

According to the above configuration, requirement of user authentication to access a function of the electronic peripheral device can be configured on a communication interface basis so that the availability can be suitably configured based on a group of users that access the electronic peripheral device via the communication network. Further, operability of configuration can be improved as the requirement of user authentication can be configured collectively based on a combination of the communication interface and the function.

With the above configuration, for example, when terminal devices that are configured to be used exclusively by users outside an organization with lower accessibility are aggregated to a specific communication interface, a process to authenticate the specific interface can be omitted. Therefore, a process for the users outside the organization to input information required to access the function can be simplified. Further, as the terminal devices for the users outside the organization can be aggregated to a specific communication interface (for example, a specific wireless interface) while availability of the functions allowed to the specific communication interface is substantially limited, minor functions that may not be significant can be configured to be completely available to the users outside the organization without requiring an authentication process so that usage of the electronic peripheral device for the users outside the organization can be improved. For example, when the electronic peripheral device is a multifunction printing apparatus, the minor functions can include a scanning function that may not necessarily use consumable materials (for example, recording paper, toner, and ink) or require communication charge (while a facsimile transmission/reproduction function, for example, may require a communication charge). Further, a function that requires consumable materials and a charge can be configured to be available upon setting a maximum amount (for example, maximum allowable number of recording sheets, maximum allowable communication charge, and maximum allowable distance for communication).

Optionally, the function execution controlling system can comprise an available function display controlling system to display information indicating the at least one of the plurality of functions determined to be available on a display unit of the terminal device. Still optionally, the terminal device can be provided with a function selecting system in which the at least one of the plurality of functions provided to the electronic peripheral device is selected by the user. A screen to allow the user to recognize the at least one of the plurality of functions determined to be available to the terminal device can be displayed on the display unit of the terminal device when the at least one of the plurality of functions is selected.

According to the above configuration, the user can easily recognize an available function so that the function can be used properly according to the information displayed.

Optionally, the plurality of communication interfaces can comprise a wireless communication interface and a wired communication interface. The terminal device connected with the wireless communication interface has the availability of the at least one of the plurality of functions.

According to the above configuration, with the wireless communication interface, a user having a wireless terminal (mobile) device can access the function of the electronic peripheral device without configuring hardware to connect the wireless terminal device with the communication network as long as the user is in a predetermined area wherein the wireless device can be wirelessly connected to the communication network. Thus, for example, one of the functions of the electronic peripheral device can be available to the users outside the organization. In such a case, as the wireless terminal devices are portable and thus can be more easily lost or stolen compared to wired terminal devices, various potential users of the wireless terminal devices can be assumed to be users outside the organization. Therefore, accessibility to the wireless communication interface is configured to be highly limited.

More specifically, a wired communication interface connected with a wired communication network such as an in-facility LAN that can be accessed exclusively by the users inside the organization and a wireless communication interface connected with a wireless communication network that can be accessed by the users outside the organization can be provided so that availability of functions to the wired communication interface can be collectively configured while availability of functions to the wireless communication interface can be arbitrarily configured depending on, for example, users and the functions. Thus, the availabilities can be suitably configured.

Optionally, the electronic peripheral device can be a multifunction printing apparatus having at least an image printing function and an image scanning function. The image printing function can be the at least one of the plurality of functions. Still optionally, the image printing function can comprise a color printing function and a monochrome printing function. The image printing function can be the at least one of the plurality of functions. Further optionally, the multifunction printing apparatus can comprise a facsimile transmission and reproduction function. The facsimile transmission and reproduction function can be the at least one of the plurality of functions.

According to the above configuration, when the electronic peripheral device is a multifunction peripheral device having the image printing function, the image scanning function, and the facsimile transmission/reproduction function, the availability of the multifunction peripheral device can be configured based on usage cost of each function. For example, when the image printing function is executed, cost for a recording medium such as paper is necessary. Further, printing in colors generally requires higher cost for printing than printing in monochrome. When the facsimile transmission/reproduction function is executed, communication cost for using the communication network may be required. On the other hand, the scanning function, not requiring consumable materials such as paper, toner, and ink, has a lower operating cost. Therefore, in consideration of the operating cost for using the functions, by setting the functions that have a higher operating cost due to usage of consumable product or incurring of a charge, to the subject of the function restriction setting, for example, unrestricted usage of these functions by an outside user can be effectively restricted, thereby enabling reduction of cost.

According to some aspects of the invention, there is provided an electronic peripheral device comprising a plurality of functions, a plurality of communication interfaces that are respectively connected with different communication networks, a function availability setting system, by which availability of at least one of the plurality of functions to a terminal device is set, an interface judging system, which judges to determine one of the plurality of communication interfaces that is connected with the terminal device, a receiver system, which receives an instruction sent from the terminal device to the electronic peripheral device to execute one of the plurality of functions, a function execution controlling system, which controls execution of one of the plurality of functions based on as to through which communication interface the instruction is received so that the availability of the one of the plurality of functions set by the function availability setting system is applied to the terminal device that sent the instruction.

Optionally, the plurality of communication interfaces can comprise a wireless communication interface and a wired communication interface. The function availability setting system can restrict availability of at least one of the plurality of functions to the wireless communication interface.

Optionally, the plurality of functions can comprise color printing function and monochrome printing function. The function availability setting system can restrict availability of the color printing function.

Hereinafter referring to the accompanying drawings, a controlling system for an electronic peripheral device according to a first embodiment of the invention will be described. The electronic peripheral device in the present invention comprises a printing apparatus, a facsimile machine, a copier, and an MFP that combine functions of the aforementioned devices. In the following embodiments, a controlling system for a network comprising an MFP equipped with a printing function and at least one of the other functions of the aforementioned devices as the electronic peripheral device and a terminal device will be explained.

FIG. 1 shows a diagram to illustrate a controlling system 1 according to an embodiment of the invention. The controlling system 1 comprises an MFP 10 as an electronic peripheral device, an administrative terminal device 30a, which is specifically available to an administrator of the system, and a client terminal device 30b. The MFP 10, the terminal administrative device 30a, and the client terminal device 30b are interconnected via wired communication network 300. Further, the controlling system 1 comprises portable client terminal devices 40a, 40b, which are connected to the controlling system 1 via wireless communication network 400. For communication via the wired communication network 300, cables such as a serial communication cable, a parallel communication cable, and a wired LAN cable may be used. For communication via the wireless communication network 400, communication methods such as a wireless LAN, IEEE 802.1x, and Bluetooth may be used so that a plurality of client terminal devices can be connected to a wireless ad-hoc network without involving access points.

Figure 2:
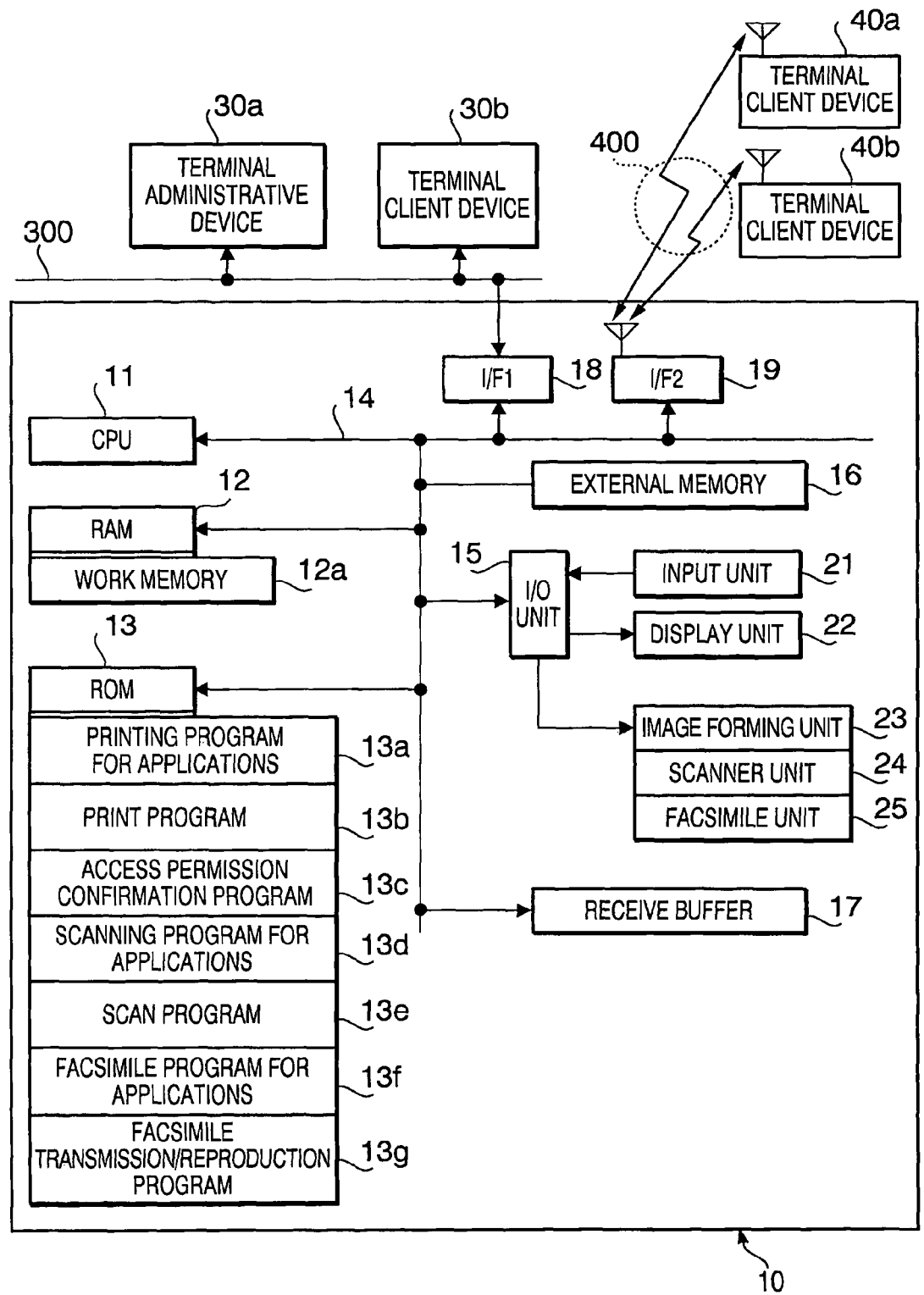
FIG. 2 is a block diagram illustrating an internal configuration of an MFP (multi-function peripheral) according to an embodiment of the invention.

FIG. 2 shows a block diagram to illustrate an internal configuration of the MFP 10 according to the embodiment of the invention. The MFP 10 comprises a CPU 11, a RAM 12 having a work memory 12a, a ROM 13, which stores various programs therein, bus line 14, an I/O (input/output) unit 15, an external nonvolatile memory 16 such as an EEPROM, communication I/Fs (interfaces) 18, 19, which receive controlling data for printing from the terminal devices 30a, 30b, 40a, 40b via the communication networks 300, 400, and a receive buffer memory (hereinafter referred to as a receive buffer) 17. The I/O unit 15 comprises an input unit 21 having for example a touch-sensitive panel, a switch button, and a numeric keypad, and a display unit (for example an LCD (liquid crystal display)) 22. The I/O unit 15 is connected to an image forming unit 23, which includes a known printing mechanism such as an inkjet printing mechanism, a laser printing mechanism, a thermal transfer printing mechanism, and a dot impact printing mechanism. The I/O unit 15 is further connected with a scanner unit 24 which reads an image of an original document and with a facsimile unit 25 which transmits for example the scanned image and reproduce for example an image received through the communication I/Fs 18, 19. The communication I/F 18 is an interface for wired communication which is connected to the wired communication network 300, while the communication interface 19 is an interface for wireless communication which is connected to the wireless communication network 400. The ROM 13 stores printing program 13a for applications, print program 13b, and access permission confirming program 13c for application, which will be described in detail later.

Figure 3:
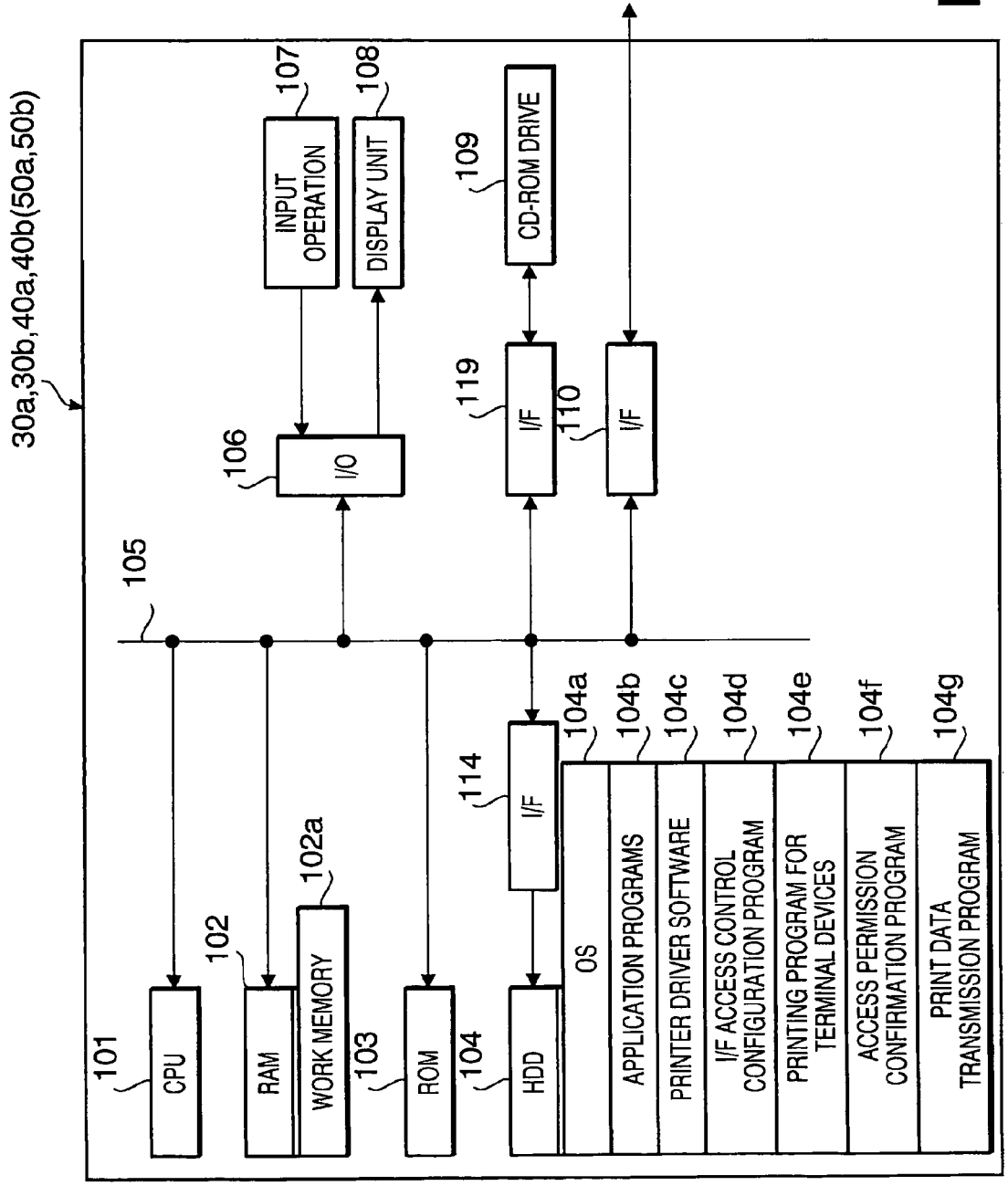
FIG. 3 is a block diagram illustrating an internal configuration of terminal devices according to an embodiment of the invention.

FIG. 3 shows a block diagram to illustrate an internal configuration of the terminal devices 30a, 30b, 40a, 40b according to the embodiment of the invention. Each of the terminal devices 30a, 30b, 40a, 40b is configured to be a known personal computer or a work station, having a CPU 101, a RAM 102 having a work memory 102a, a ROM 103 storing various programs therein, an HDD (hard disk drive) 104 as a memory device, a bus line 105, an I/O unit 106, a CD-ROM drive 109, a communication interface 110 to be connected with the wired communication network 300 or the wireless communication network 400 for transmitting and receiving the controlling data for printing. The HDD 104 and the CD-ROM drive 109 are connected to the bus line 105 via I/Fs 114, 119. Various software including OS (operating system) 104a for the terminal devices 30a, 30b, 40a, 40b, various application programs 104b for printing operations, printer driver software 104c for processing printing instruction to the MFP 10 are installed in the HDD 104. Further, the HDD 104 stores therein temporal controlling data (not shown) for printing, which includes print job data generated by the application software 104b, to be processed by the printer driver software 104c. The I/O unit 106 is connected with an input operation unit 107 (for example a key board and a mouse) and a display unit 108 (for example an LCD or a CRT (cathode ray tube)).

It should be noted, with the configuration as described above, execution of a function provided to the MFP 10 is controlled by the MFP 10, specifically by the CPU 11 of the MFP 10 executing the printing application program 13a, the print program 13b, and the access permission confirmation program 13c for applications. The execution of the function by the MFP 10 is achieved as the printing program 104e for terminal devices, the access permission confirmation program 104f for terminal devices, the print data transmission program 104g stored in the HDD 104 are executed by the CPU 101 of the terminal devices 30a, 30b, 40a, 40b according to a predetermined operation inputted by the user through the input unit 104 of the terminal devices 30a, 30b, 40a, 40b. It should be further noted that the I/F access control configuration program 104d, the printing program 104e for terminal devices, the access permission confirmation program 104f, and the print data transmission program 104g can be distributed in a recording medium such as a CD-ROM to be installed and stored in the HDD 104 of the terminal devices 30a, 30b, 40a, 40b as the CD-ROM drive 109 reads the programs 104d, 104e, 104f, 104g. Alternatively, the programs 104d, 104e, 104f, 104g can be downloaded in the HDD 104 of the terminal devices 30a, 30b, 40a, 40b via the communication networks 300, 400. Furthermore, the printing application program 13a, the print program 13b, and the access permission confirmation program 13c for applications may not have been previously installed in the ROM 13 of the MFP 10, but may be read from a recording medium such as a CD-ROM by the CD-ROM drive 109 of the terminal devices 30a, 30b, 40a, 40b. Alternatively, the programs 13a, 13b, 13c may be downloaded by the terminal devices 30a, 30b, 40a, 40b and transmitted to the MFP 10 via the communication networks 300, 400, so that the programs 13a, 13b, 13c can be installed in a memory unit such as an EEPROM (not shown) of the MFP 10.

The terminal devices 30a, 30b in the present embodiment are fixed devices that are available to members in a limited group, such as an organization wherein the controlling system 1 is provided. The terminal devices 30a, 30b are wired to be aggregated to the communication I/F 18 of the MFP 10 via the wired communication network 300 so that persons outside the organization cannot access the controlling system 1 via the wired communication network 300. The terminal devices 40a, 40b are mobile wireless terminal devices, which are aggregated to be wirelessly connected to the communication I/F 19 via the wireless communication network 400. With the terminal devices 40a, 40b, users who are inside and outside the organization can access the controlling system 1 via the wireless communication network 400 as long as the terminal devices 40a, 40b are in a predetermined area. The MFP 10, which is interconnected with the terminal devices 40a, 40b, can be accessed by the users inside the organization and by the users outside the organization when the terminal devices 40a, 40b are connected with the wireless communication network 400. Thus, the users with different limitation levels (i.e., the users inside the organization and the users outside the organization) are grouped into two, and each of the groups is corresponded to one of the communication networks 300, 400 (i.e., the communication I/Fs 18, 19 of the MFP 10), to which the terminal devices 30a, 30b, 40a, 40b are connected.

In the present embodiment, availability of the functions of the MFP 10 and accessibility to the MFP 10 can be set individually based on the communication I/Fs 18, 19 to which the communication networks 300, 400 are connected when the I/F access control configuration program 104d stored in the HDD 104 is executed in the administrative terminal device 30a by a user of the administrative terminal 30a (hereinafter referred to as an administrator). As the terminal device to configure the availability and the accessibility to the MFP 10 is limited to the administrative terminal device 30a, the availability of functions of the MFP 10 for individual users (i.e., individual client terminal devices 30b, 40a, 40b) can be administrated intensively, and security to the controlling system 1 can be improved. It should be noted that the availability and the accessibility can be also configured via an arbitrary client terminal device by setting identification information such as an administration ID and a password in the client terminal device.

Hereinafter, referring to FIGS. 4A-4E, a flow of steps executed in the I/F access control configuration program 104d will be described. FIGS. 4A-4E illustrate the I/F access control configuration program 104d to configure availability of functions of the MFP 10 according to the embodiment of the invention.

Figure 4A:
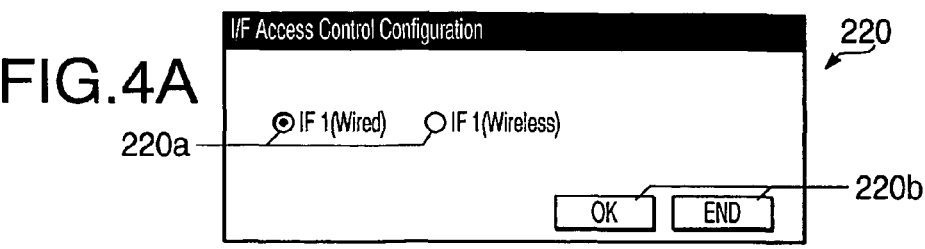
FIGS. 4A-4E illustrate a process to configure availability of functions of the MFP according to an embodiment of the invention.
Figure 4B:
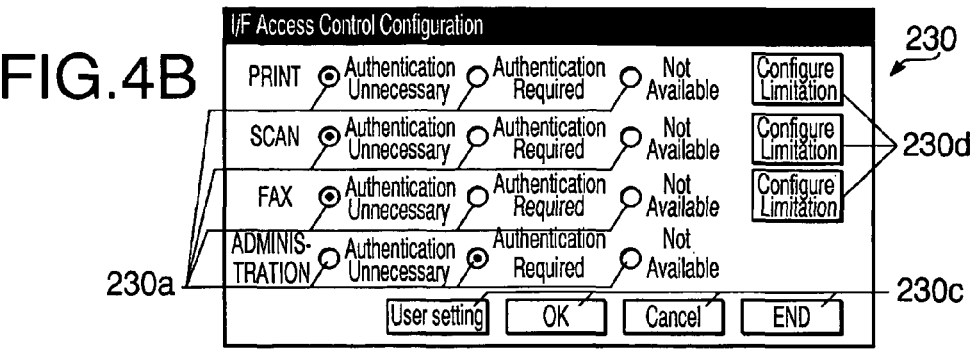

As the I/F access control configuration program 104d is executed, a window 220 as shown in FIG. 4A is displayed on the display unit 108 of the terminal device 30a so that an interface to be used for accessing the MFP 10 is selected. More specifically, radio buttons 220a, each of which indicates the interface to be used for accessing the MFP 10, are shown on the display unit 108. It should be noted that, in FIG. 4A, IF 1 indicates the wired communication I/F 18, and IF 2 indicates the wireless communication I/F 19. As the administrator specifies one of the interfaces by clicking the corresponding radio button 220 and subsequently clicking an OK button 220b, the desired interface is selected. Thereafter, a window 230 as shown in FIG. 4B, through which the administrator can select functions to be limited and limitation level thereof, is displayed. In the present embodiment, the MFP 10 is provided with a printing function, a scanning function, a facsimile transmission/reproduce function, and an administrating function as applications (functions). For each application, the administrator can select availability and necessity of authentication of other users when the function is determined to be available to the users by switching on and off the radio buttons 230a on the window 230 shown in FIG. 4B. In the present embodiment, the administrator selects availability and limitation level of the MFP 10 by specifying one of "authentication unnecessary", "authentication required", and "not available". In FIG. 4B, the printing function, the scanning function, and facsimile transmission/reproduce function are configured not to require authentication of the users, while the administrating function is configured to require authentication. When the OK button 230b is clicked by the administrator, the configuration is completed.

Figure 4C:
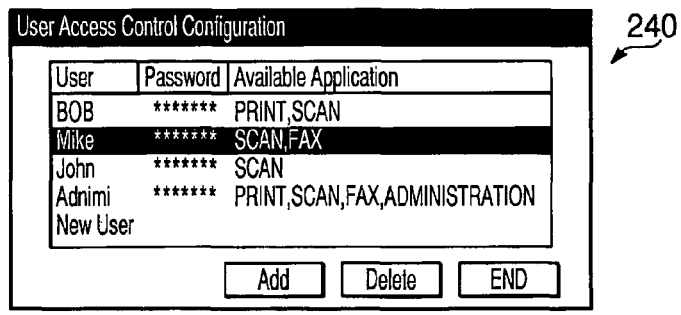
Figure 4D:
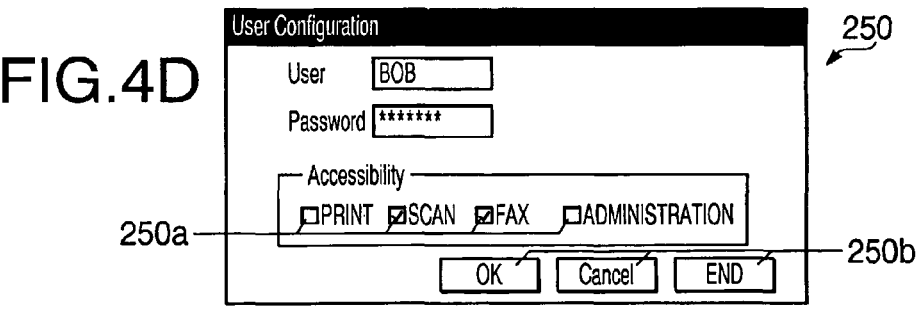

When the administrator clicks a user setting button 230c in the window 230, a window 240 as shown in FIG. 4C is displayed. In the window 230, a list with names of the users previously registered and the applications of the MFP 10 allowed to each of the users is shown. When the administrator selects a name of a specific user (in the present embodiment, by double-clicking "BOB"), a window 250 shown in FIG. 4D is displayed. After the administrator inputs the name of the user (BOB) and a password to identify the user, the applications to be available to the user can be specified as the administrator clicks on checkboxes 250a indicating the applications of the MFP 10 to place checkmarks therein. In the present embodiment, the checkboxes 250a with the checkmarks therein indicates the applications to be available to the user, however, the checkboxes 250a with the checkmarks therein may indicate the applications to be unavailable to the user. It should be noted in FIG. 4C that the applications available to BOB are printing function and the scanning function, however, as the checkboxes 250a indicating the scanning function and the facsimile transmission/reproduction function are checked as shown in FIG. 4D, the scanning function and the facsimile transmission/reproduction function become the applications currently available to BOB. When the administrator clicks on an OK button 250b, the availability of the applications configured as above is registered to be valid. In FIG. 4C, when a user name indicated as "New User" is selected, the administrator can register a new user to configure the availability. When the checkbox 250a indicating "administration" is selected, the user name and the password inputted are registered as authentication information of the administrator.

It should be noted that the users to be registered may be persons outside the organization (for example, visitors to the organization). Further, the visitors may be grouped by significance (for example, a valued customer and a new customer) so that the availability of the applications of the MFP 10 can be limited by different limitation levels.

Figure 4E:
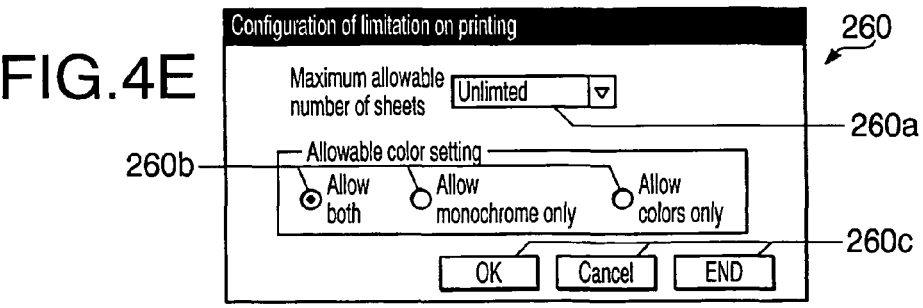

In the window 230 shown in FIG. 4B, when "configure limitation" buttons 230d are clicked, a window 260 shown in FIG. 4E is displayed. In the present embodiment, "configure limitation" button 230d for the printing function is selected. In the window 260, the administrator can configure specific limitations of the printing function, which are a maximum allowable number of sheets of paper and an allowed color setting (monochrome or colored). The maximum allowable number of sheets may be selected from a list in a pull-down menu shown by an operation of the administrator (by clicking an arrow 260a indicated by the pull-down menu window, for example). The color setting may be specified by marking on one of radio buttons 260b. In the present embodiment, the maximum allowable number of sheets is specified as "unlimited", and the color setting "allow both", which includes both monochrome printing and colored printing, is marked to be allowed. When an OK button 260c is clicked, the limitations specified as above are registered to be an available configuration. It should be noted that the specific limitations may not limited to the limitations described above, but other limitations, for example types of recording medium, sizes of paper, may be configured. Further, other specific limitations may be configured in other functions than the printing function. For example, communication charge for transmission may be limited so that one user may be allowed to make merely local calls while another user may use up to a predetermined amount to be charged.

Upon completion of the configuration, the specific limitations are transmitted to the MFP 10 via the wired communication network 300 and are stored in the external memory 16 of the MFP 10. The information contained in the specific limitations is stored in a user access control list, in which names of the communication I/Fs 18, 19 and names of the applications correspond to the specific limitations.

More specifically, when IF 1 is specified, the printing function, the scanning function, the facsimile transmission/reproduction function are configured to be available to the users in the organization without being authenticated. Therefore, the users of the terminal devices 30a, 30b are allowed to access the MFP 10 with no authentication step being required. It should be noted that access control via the wired communication I/F 19 can be configured as IF 2 is specified in the window 220 shown in FIG. 4A. When IF 2 is used, it is considered that users outside the organization may also use the MFP 10. Therefore, for example, the printing function that may require cost for the recording paper and other consumable materials is configured to require authentication, while the scanning function that may not necessarily use consumable materials is configured not to require authentication. Further, the facsimile transmission/reproduction function, which may require communication charge, is configured to be unavailable. Furthermore, the administration function is also configured to be unavailable in consideration of security. With this configuration, the control system 1 wherein security and operation cost is controlled can be achieved.

It should be noted that, in I/F access control configuration program 104d, the availability and the accessibility to the MFP 10 of the both communication I/Fs 18, 19 that are provided to the MFP 10 can be configured, although one of the communication I/Fs 18, 19 can be configured in I/F access control configuration program 104d. For example, the communication I/F 18 that is assumed to be used by merely users inside the organization can be configured to be freely accessible so that the users can use the applications without being authenticated. In this case, the configuration is registered to be unmodifiable while the communication I/F 19 that is assumed to be used also by users outside the organization as well as the users inside the organization is configured to be limited in the availability and the accessibility. On the contrary, the communication I/F 18 can be configured to be limited in the availability and the accessibility, while the communication I/F 19 can be configured so that the scanning function, that may not necessarily require a communication charge, is available to the users, while the other applications are unavailable and unmodifiable, and the configuration cannot be modified in an unauthorized manner. Thus, when the availability and the accessibility of the interface should not be modified, the interface can be configured to be unmodifiable so that the configuration should not be improperly modified and the security of the controlling system 1 improved.

In the controlling system 1 of the present invention with the configuration described above, the applications of the MFP 10 can be accessed and used according to the limitation set as above. More specifically, printing program 104e for terminal devices stored in the HDD 104 of the terminal devices 30a, 30b, 40a, 40b is started when an operation from the user is inputted through the input unit 107.

Hereinafter, referring to FIGS. 5 through 11, printing operations executed in the MFP 10 which is accessed by the terminal devices 30a, 30b, 40a, 40b will be explained. FIGS. 5A and 5B show windows to be shown on the display unit 108 of the terminal devices 30a, 30b, 40a, 40b according to the embodiment of the invention.

When the printing function of the MFP 10 is used through one of the terminal devices 30a, 30b, 40a, 40b, a window 270 shown in FIG. 5A, in which the application to be used is selected, is displayed on the display unit 108 of the one of the terminal devices 30a, 30b, 40a, 40b. The user selects one of the applications shown in a list of a pull-down menu displayed in the window 270. When at least one of the applications that is configured to be unavailable, as the specific limitations stored in the external memory 16 of the MFP 10, is read before the list is displayed, the unavailable applications are presented to be not selectable in the list as shown in a window 270a in FIG. 5B. More specifically, for example, the unavailable applications can be displayed in a different manner than the available applications. For another example, the unavailable applications may be completely omitted. Further, on a right-hand side of the window 270, limitations regarding the printing function are displayed. In the present embodiment, a maximum allowable number of sheets of recording paper and color setting, to specify whether the printing is executed in monochrome or in colors, are displayed. Hereinafter, it is assumed that the printing function is selected in the window 270 shown on the display unit 108 of the terminal device 30a, although the following processes executed in the terminal device 30a can be similarly executed in the terminal devices 30b, 40a, 40b. As the user selects, printing program 104e for terminal devices for terminal devices stored in the HDD 104 is started.

Figure 6:
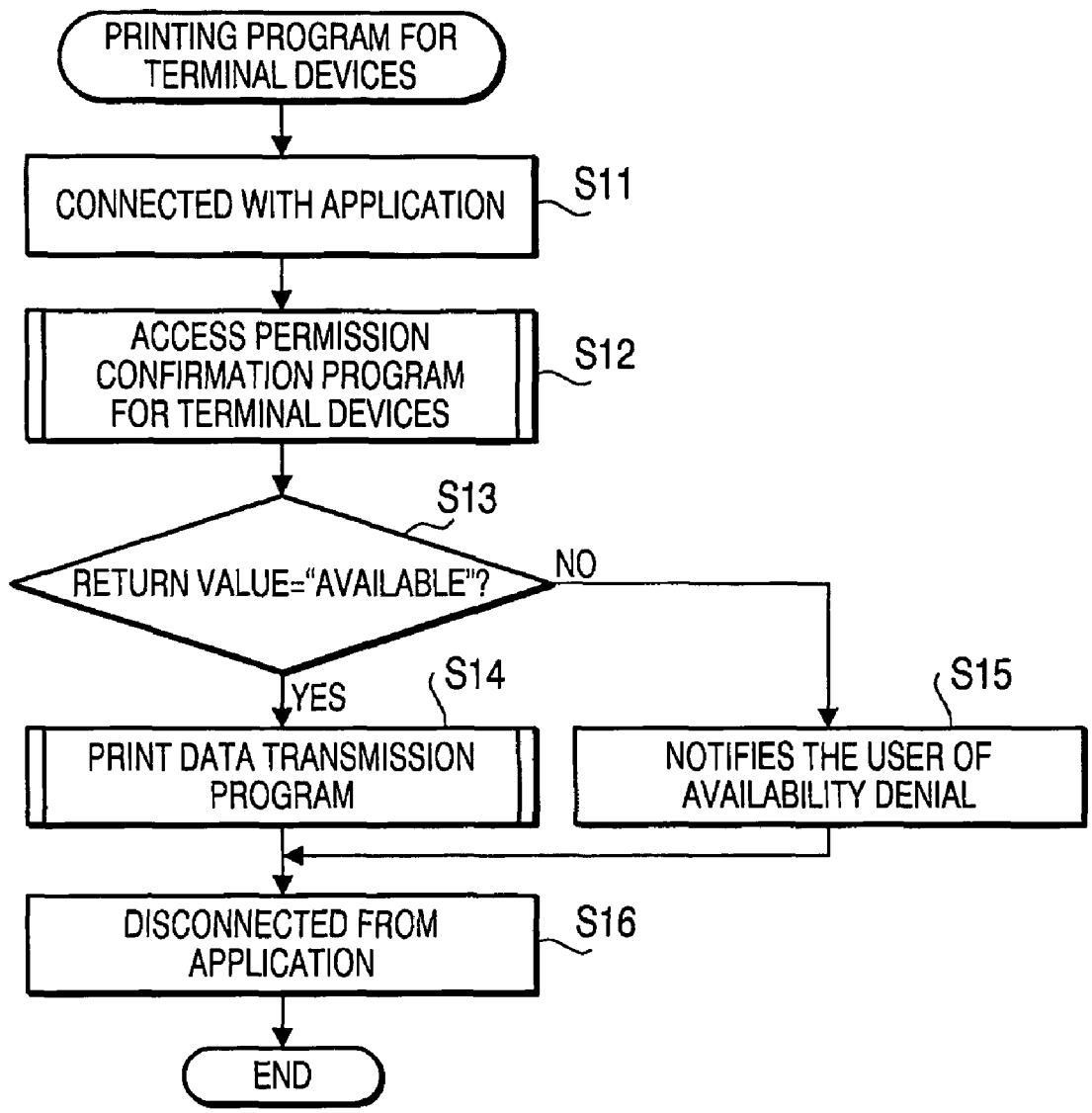
FIG. 6 is a flowchart to illustrate a printing program for terminal devices executed by the terminal devices according to an embodiment of the invention.
Figure 7:
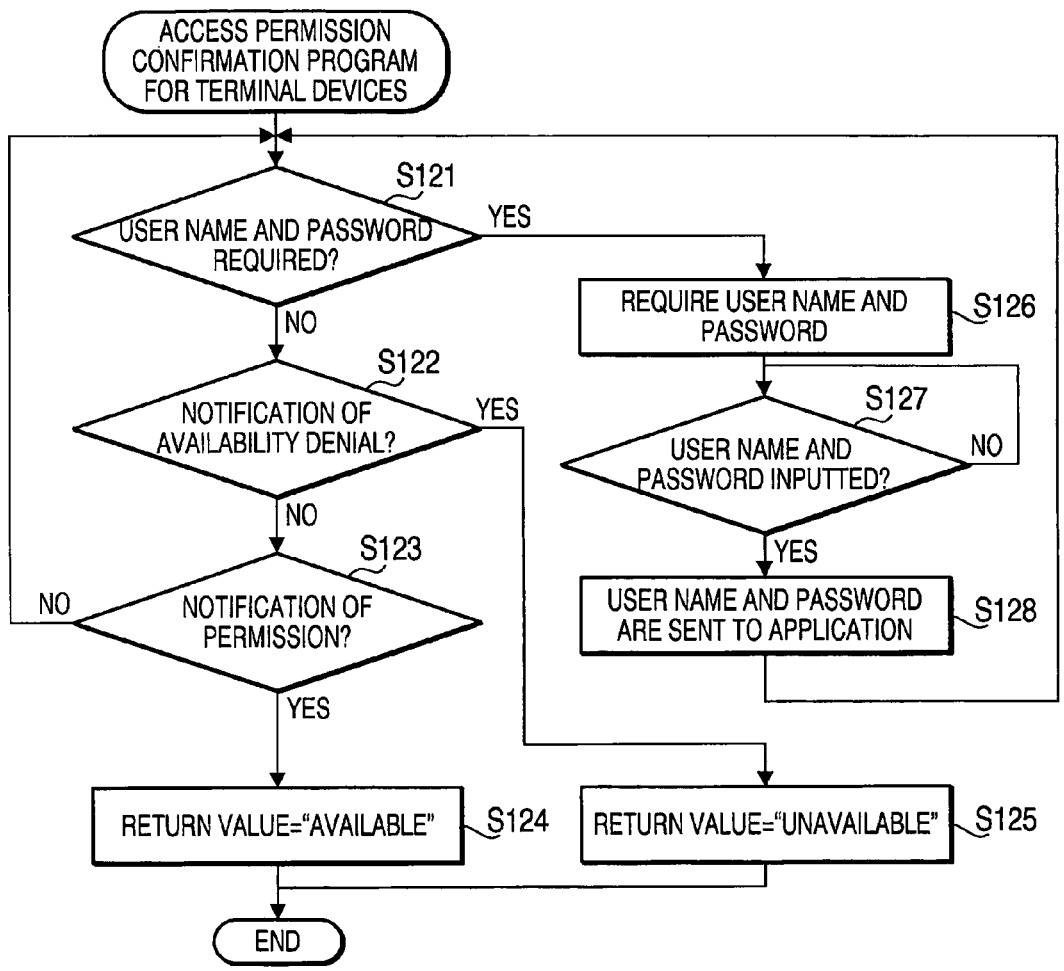
FIG. 7 is a flowchart to illustrate an access permission confirming program for terminal devices according to the embodiment of the invention.

FIG. 6 is a flowchart to illustrate printing program 104e for terminal devices executed by the terminal device 30a according to an embodiment of the invention. First, in S11, printing program 104e for terminal devices is connected to the printing program 13a for applications being executed in the MFP 10 via the wired communication network 300. Next, in S12, the access permission confirmation program 104f for terminal devices stored in the HDD 104 is executed. FIG. 7 is a flowchart to illustrate the access permission confirming program for terminal devices 104f according to an embodiment of the invention. As the access permission confirming program 104f for terminal devices is started, in S121, determination is made as to whether a user name and a password are required. When the user name and the password are required (S121: YES), the process requires the user to input the user name and the password (S126). In S127, it is judged weather the user name and the password are inputted. When no user name or password are inputted (S127: NO), S127 is repeated until the user name and the password are inputted. When the user name and the password are inputted (S127: YES), the process proceeds to S128. In S128, the user name and the password are sent to the application with which the access permission confirming program 104f for terminal devices has been connected in S11 (i.e., the printing program 13a for applications in the present embodiment). When no user name or password are required in S121 (S121: NO), the process proceeds to S122.

In S122, determination is made as to whether a notification of availability denial issued from the printing program 13a for applications is received. The notification of availability denial in the present embodiment refers to a notification to notify the terminal device 30a of unavailability of printing function of the MFP 10, which will be described in detail later. When the notification is received (S122: YES), in S125, a flag concerning a return value is set ON (i.e., the usage of the printing function is denied) in the RAM 12 of the MFP 10. Thereafter, the access permission confirmation program 104f is terminated. When no notification is received (S122: NO), in S123, determination is made as to whether a notification of permission is received. The notification of permission in the present embodiment refers to a notification to notify the terminal device 30a of the availability of the printing function of the MFP 10. When no notification of permission is received (S123: NO), that is, when no information regarding permission to use the printing function of the MFP 10 is provided from the printing program 13a for applications, the process returns to S121, and repeats S121. When the notification of permission is received (S123: YES), the process proceeds to S124, wherein the flag concerning the return value in the RAM 12 is reset to OFF (i.e., the usage of the printing function is permitted), and the access permission confirmation program 104f for terminal devices is terminated.

The process now returns to S12 shown in FIG. 6 and proceeds to S13. In S13, determination is made as to whether the usage of the printing function is permitted based on the flag concerning the return value in the RAM 12. When the flag is set ON (S13: NO), it is determined that the printing function is unavailable, and the process proceeds to S15, wherein usage of the printing function of the MFP 10 being denied by the printing program 13a for applications is notified to the user. The notification is made, for example, by displaying a window to notify the denial on the display unit 108 of the terminal device 30a. Thereafter, in S16, the printing program 104e for terminal devices is disconnected from the printing program 13a for applications, and the printing program 104e for terminal devices is terminated. When the flag is set OFF in S13 (S13: YES), it is determined that the usage of the printing function is permitted, and the process proceeds to S14, wherein print data transmission program 104g is executed.

Figure 8:
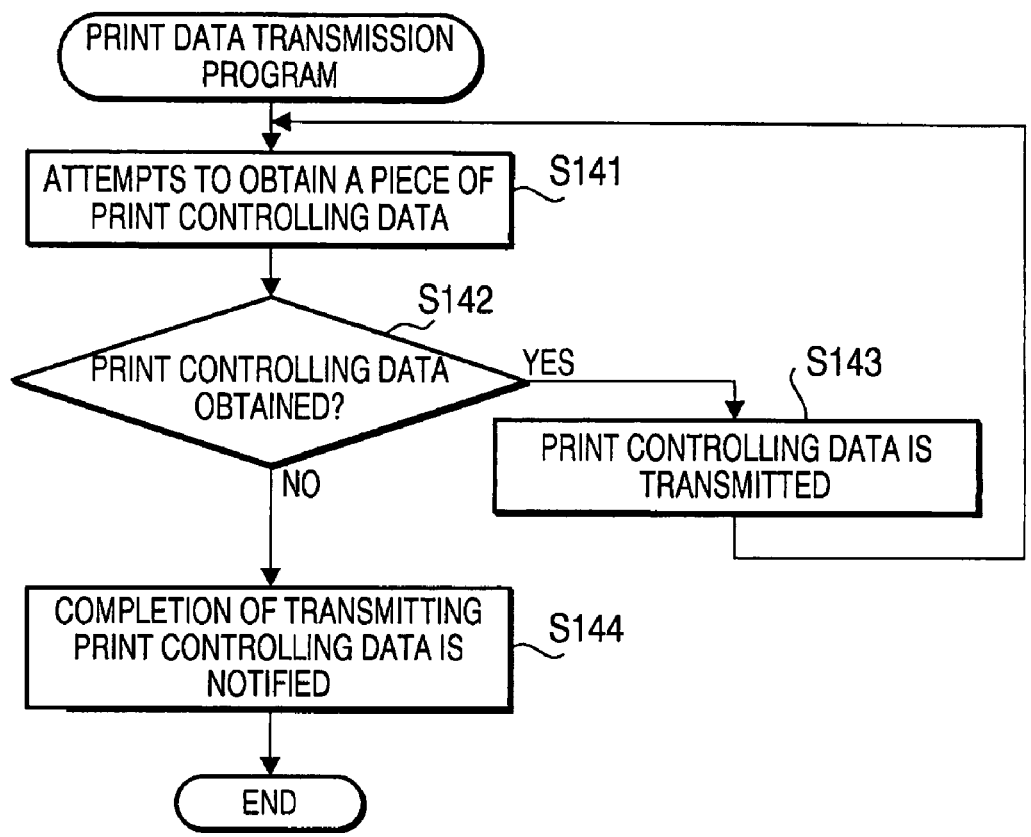
FIG. 8 is a flowchart to illustrate a print data transmission program executed by the terminal devices according to an embodiment of the invention.

In the print data transmission program 104e, print controlling data for printing is sent from the terminal device 30a to the MFP 10. FIG. 8 is a flowchart to illustrate the print data transmission program 104g executed by the terminal device 30a according to an embodiment of the invention. In S141, it is attempted to obtain a piece of print controlling data from a file stored in the HDD 104. In S142, when the piece of print controlling data is obtained (S142: YES), the process proceeds to S143, wherein the piece of the controlling data is sent to the printing program 13a for applications. The process repeats S141 and S142 until no further piece of print controlling data remains in the file. When no further piece of controlling data is obtained (S142: NO), the process proceeds to S144. In S144, a completion notification, which is a notification to notify the completion of transmitting the print controlling data is sent to the MFP 10. Thereafter, the print data transmission program 104g is terminated.

The process now returns to S14 shown in FIG. 6 and proceeds to S16. In S16, the printing program 104e for terminal devices is disconnected from the printing program 13a for applications, and the printing program 104e for terminal devices is terminated.

Figure 9A:
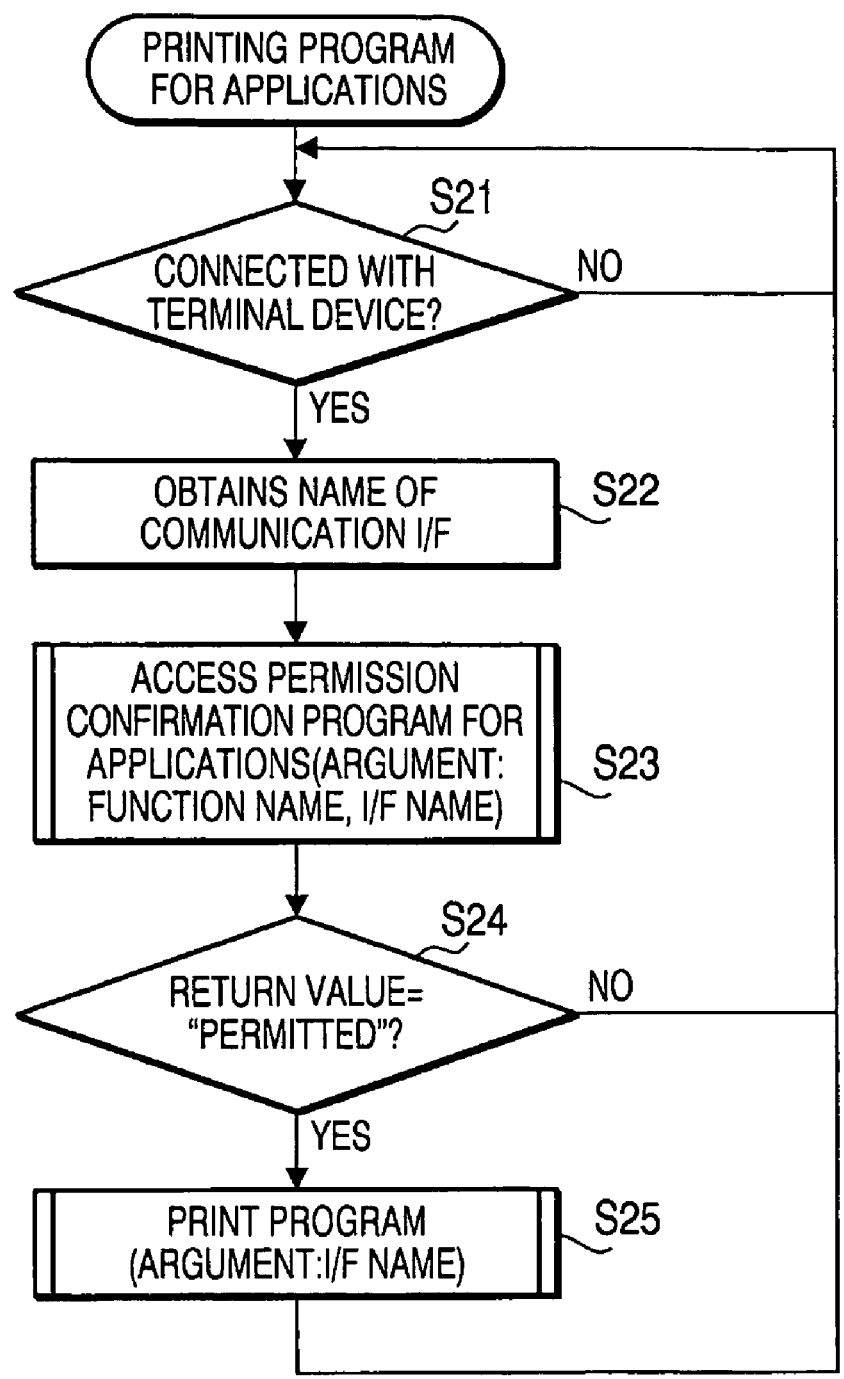
FIGS. 9A-9C are flowcharts to illustrate printing/scanning/facsimile program for applications executed by the MFP according to an embodiment of the invention.
Figure 9B:
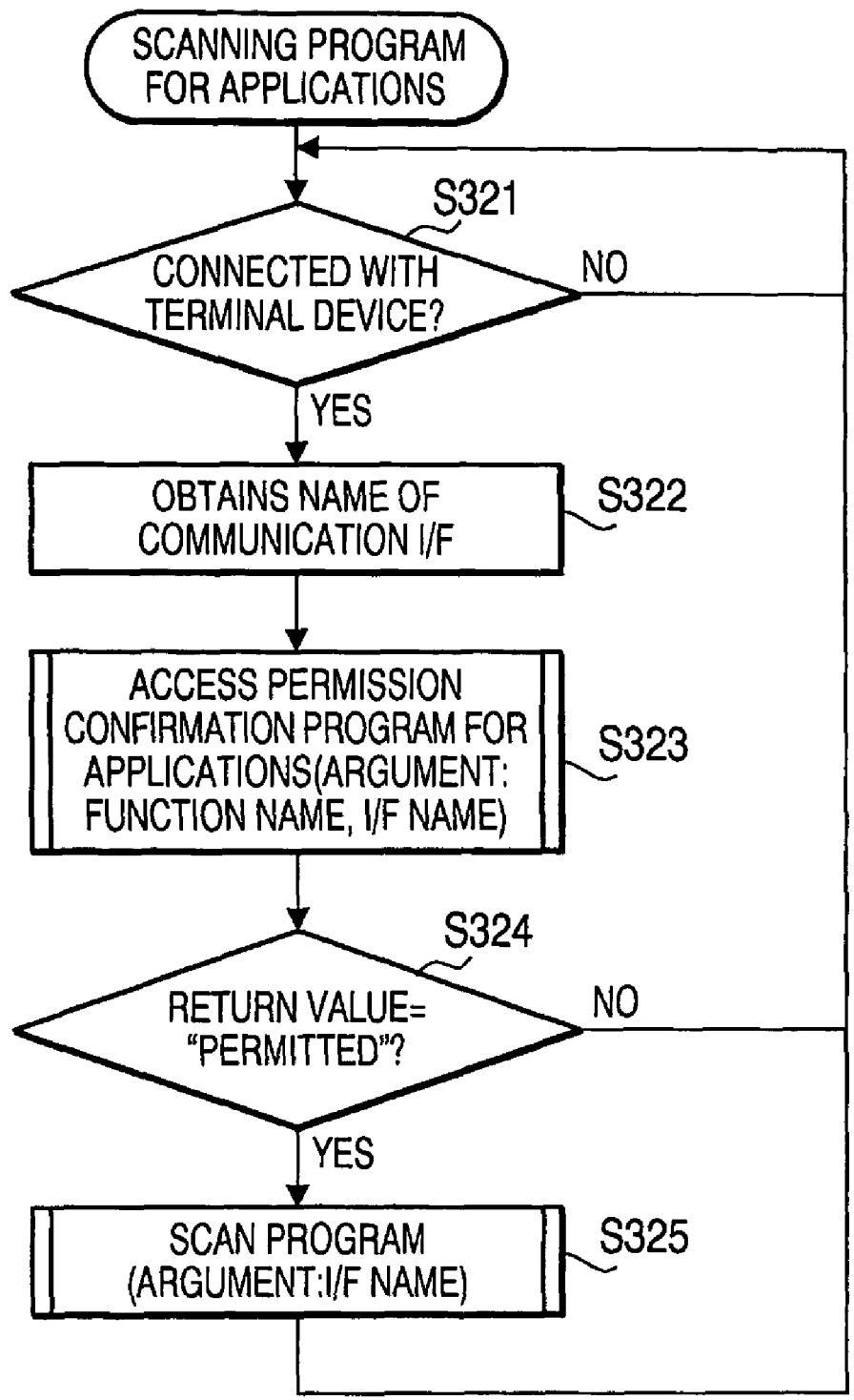
Figure 9C:
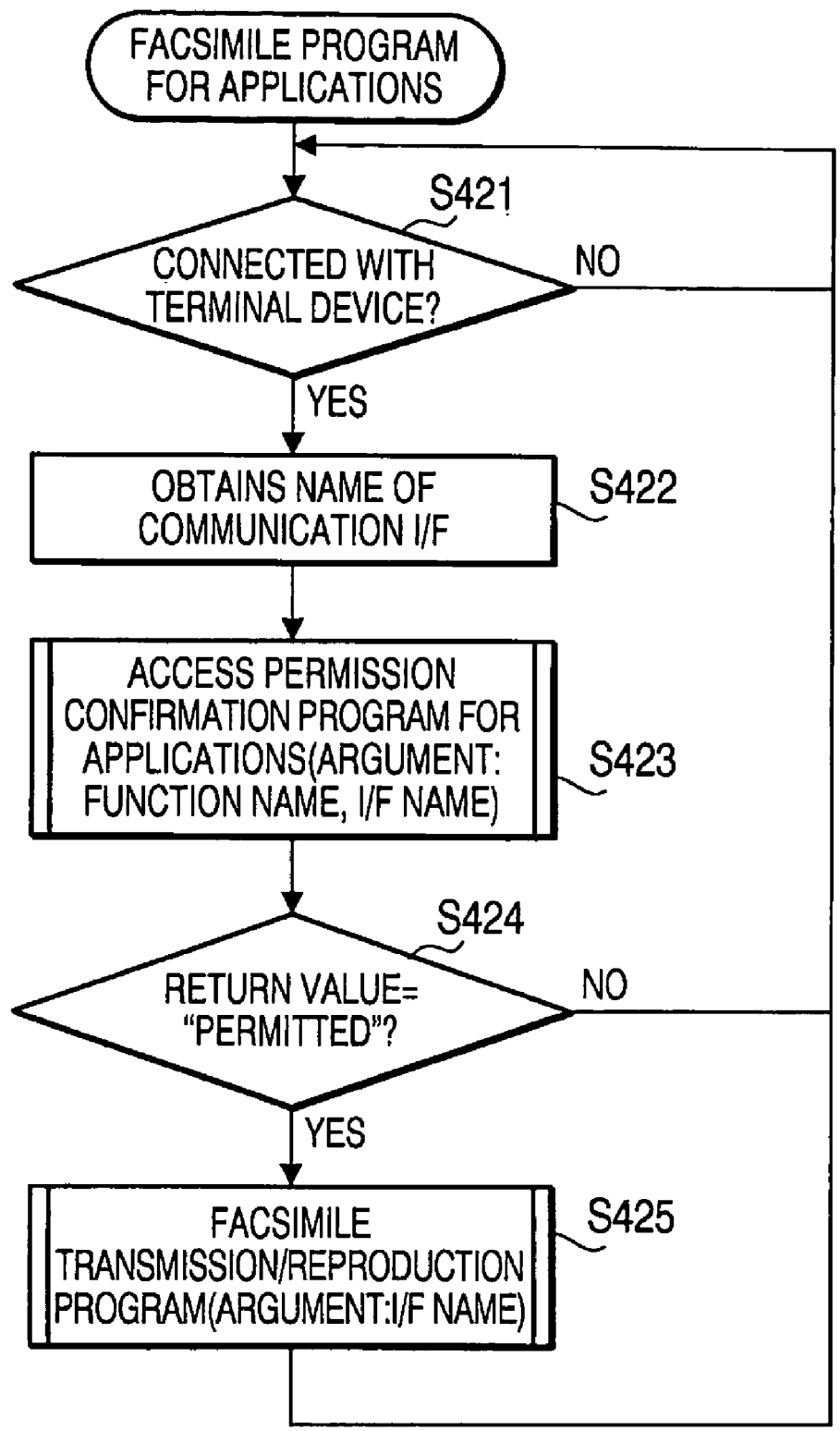

Meanwhile, in the MFP 10, the printing program 13a for applications is in a ready state. FIGS. 9A, 9B and 9C are flowcharts to illustrate printing program 13a for applications executed by the MFP 10 according to an embodiment of the invention. In the ready state, the printing program 13a for applications is in S21 and examines whether the terminal device 30a in S11 shown in FIG. 6 is connected. When the terminal device 30a is not connected to the printing program 13a for applications (S21: NO), the CPU 11 repeats S21 until the terminal device 30a is connected. When the terminal device 30a is connected (S21: YES), the process proceeds to S22. In S22, the CPU specifies the communication I/F through which the terminal device 30a is connected and obtains the name of the communication I/F. The process proceeds to S23. In S23, a name of the function to be used (i.e., the printing function in the present embodiment) and the name of the communication I/F specified in S22 are set as arguments for access permission confirmation program 13c for applications stored in the ROM 13 of the MFP 10.

Figure 10:
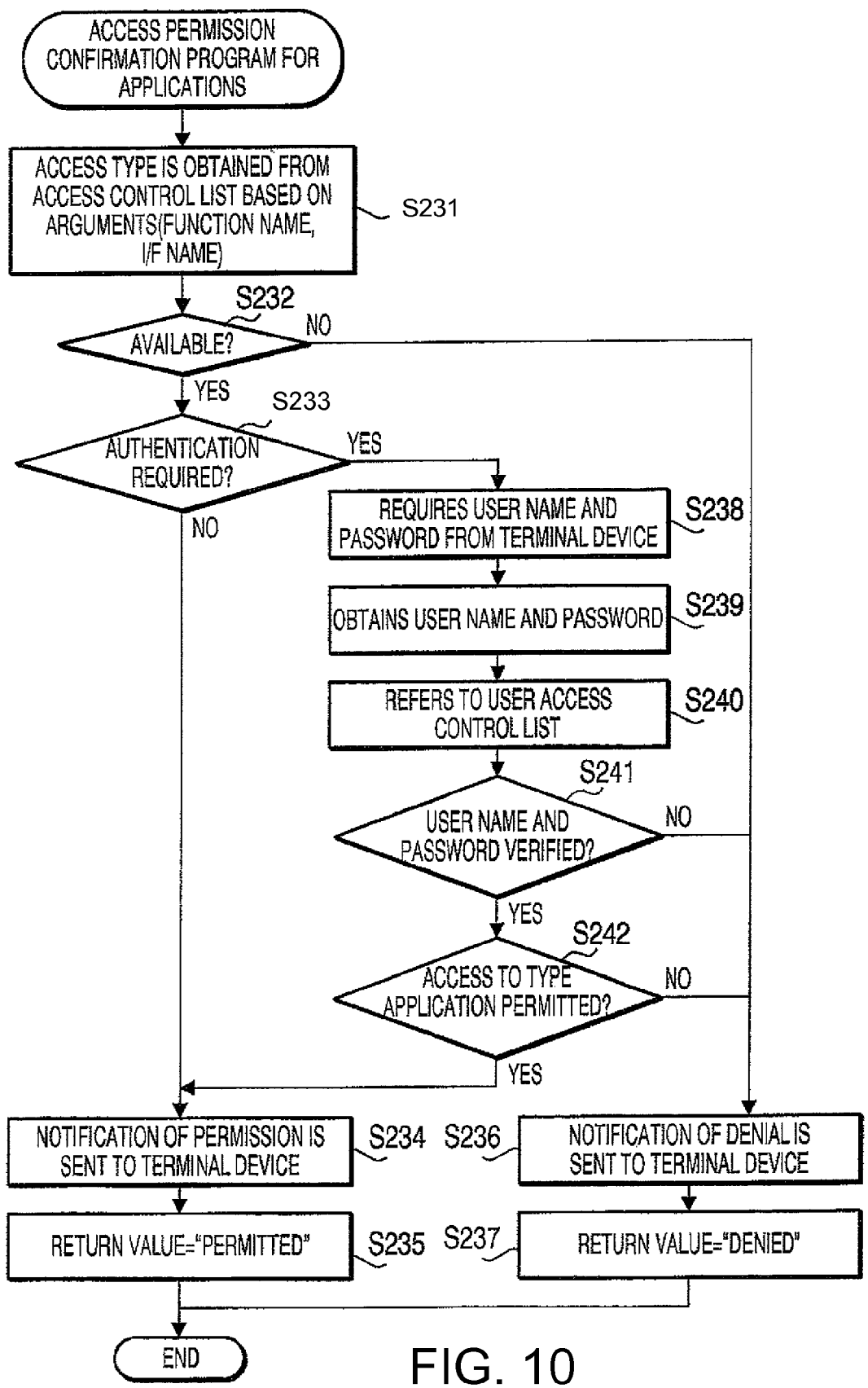
FIG. 10 is a flowchart to illustrate an access permission confirmation program for applications executed by the MFP according to an embodiment of the invention.

In S23, the access permission confirmation program 13c for applications is executed. FIG. 10 is a flowchart to illustrate the access permission confirmation program for applications executed by the MFP 10 according to the embodiment of the invention. As the access permission confirmation program 13c for applications is started, in S231, an access type as a specific limitation is obtained from an access control list stored in the external memory 16 based on the argument (i.e., the name of the function and the interface). In S232, determination is made as to whether the printing function for the access type obtained in S231 is configured to be available. When the printing function is unavailable (S232: NO), in S236, the notification of availability denial for the printing function is sent to the terminal device 30a. Thereafter, in S237, a flag concerning a return value in the RAM 102 is set ON so that usage of the printing function is denied, and the access permission confirmation program 13c is terminated. When the printing function is available (S232: YES), the process proceeds to S233.

In S233, determination is made as to whether an authentication is required for the usage of the printing function. When no authentication is required (S233: NO), the process proceeds to S234, wherein the notification of permission is sent to the terminal device 30a. Thereafter, in S235, the flag concerning the return value in the RAM 12 is reset to OFF, and the access permission confirmation program 13c is terminated.

When authentication is required (S233: YES), the process proceeds to S238, wherein the user name and the password obtained by the terminal device 30a from the user in S127 of the access permission confirmation program for terminal devices 104f are required. In S239, the user name and the password sent in S128 are obtained from the terminal device 30a. Thereafter, in S240, the user access control list stored in the external memory 16 of the MFP 10 is referred to. In S241, determination is made as to whether the user name and the password obtained in S239 are found in the user access control list in order to verify the user name and the password. When the user name and the password are not found, i.e., the user name and the password are incorrect (S241: NO), in S236, the notification of availability denial for the printing function is sent to the terminal device 30a. Thereafter, in S237, a flag concerning the return value in the RAM 102 is set ON so that usage of the printing function is denied, and the access permission confirmation program 13c is terminated. When the user name and the password are found, i.e., the user name and the password are correct (S241: YES), in S242, the accessibility of the terminal device 30a to the printing function is examined based on a reference result obtained in S240. When the accessibility is determined to be denied (S242: NO), the access permission confirmation program 13c is terminated through S236 and S237. When the access is permitted (S242: YES), the access permission confirmation program 13c is terminated through S234 and S235. It should be noted that the notification of availability denial sent in S236 corresponds to the notification received by the terminal device 30a in S122 shown in FIG. 7, while the notification of permission sent in S234 corresponds to the notification received by the terminal device 30a in S123 shown in FIG. 7.

The process now returns to S23 shown in FIG. 9A and proceeds to S24. In S24, determination is made as to whether the return value indicates the usage of the printing function being permitted based on the flag concerning the return value in the RAM 12. When the flag is set ON (i.e., the usage of the printing function is denied) (S24: NO), the process returns to S21. When the flag is set OFF (i.e., the usage of the printing function is permitted) (S24: YES), the process proceeds to S25.

Figure 11:
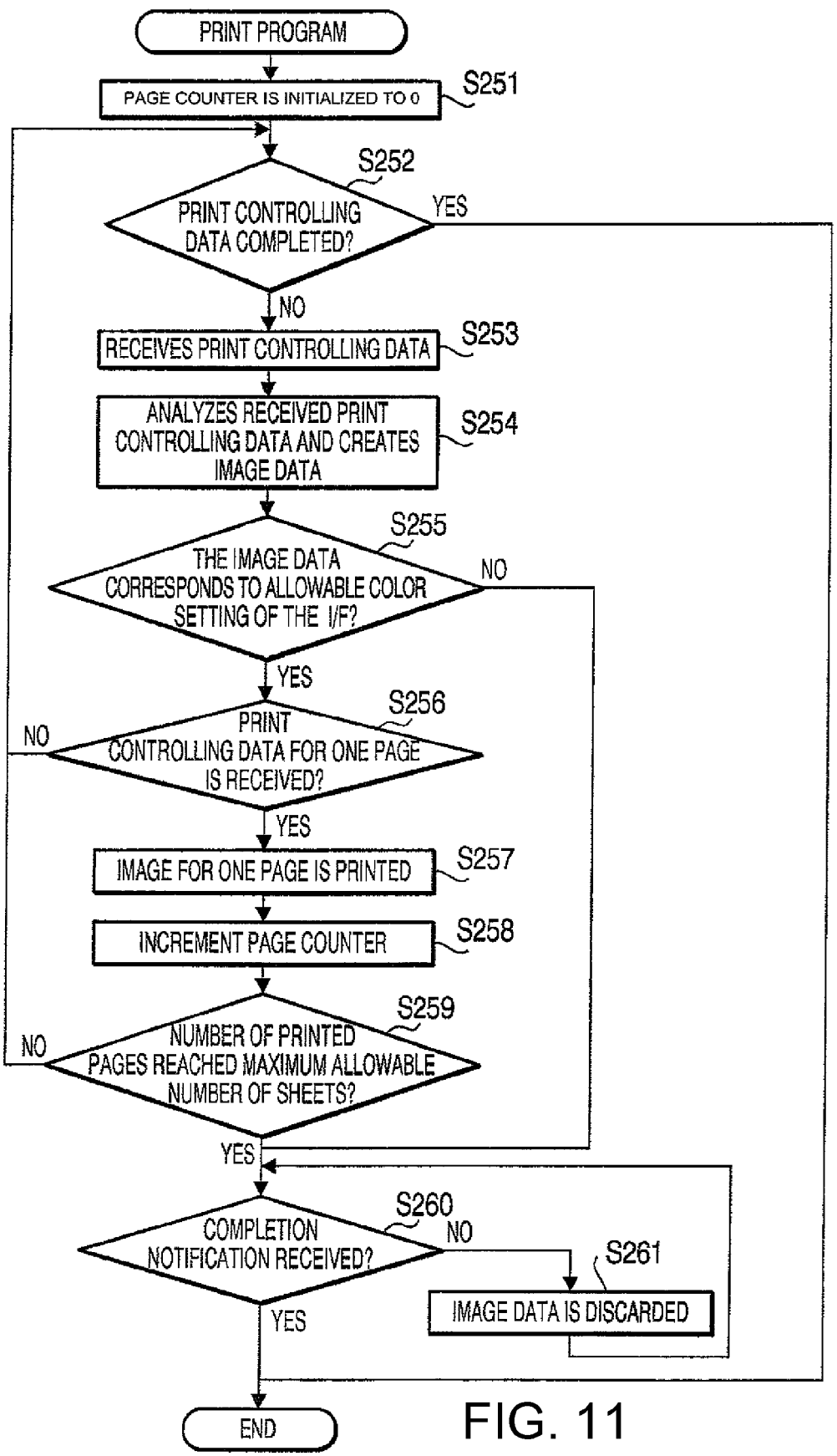
FIG. 11 is a flowchart to illustrate a print program executed by the MFP according to an embodiment of the invention.

In S25, the print program 13b stored in the ROM 13 of the MFP 10 is executed by an argument, which is the name of the interface. FIG. 11 is a flowchart to illustrate the print program 13b executed by the MFP 10 according to an embodiment of the invention. In S251, a page counter to count a number of pages to be printed is initialized to 0 according to the print controlling data sent from the terminal device 30a in S143. Next, in S252, determination is made whether receiving the print controlling data sent from the terminal device 30a is completed. The determination is made based on the completion notification to be sent from the terminal device 30a in S144. When the completion notification, which notifies the completion of transmitting the print controlling data is sent to the MFP 10 is received by the MFP 10 (S252: YES), the print program 13b is terminated. When the completion notification is not received (i.e., at least one piece of print controlling data remains) (S252: NO), the process proceeds to S253.

In S253, the piece of print controlling data is received. Next, In S254, the received print controlling data is analyzed to create image data from the received print controlling data. In S255, determination is made as to whether the image data contained in the print controlling data is output to be a colored image or a monochrome image. Further, the image setting (i.e., colored or monochrome) as a specific limitation corresponding to the name of the interface as the argument is obtained from the user access control list, and determination is made as to whether the obtained image setting corresponds to the predetermined specific limitation. When the image setting does not correspond to the specific limitation (S255: NO), the process proceeds to S260. In S260, determination is made as to whether image data for printing is received. The determination is made based on the completion notification to be sent from the terminal device 30a in S144. When no completion notification is received (S260: NO), the process proceeds to S261, wherein image data for printing being sent from the terminal device 30a is discarded. The process returns to S260. When the completion notification is received (S260: YES), the print program 13b is terminated. In S255, when the image setting corresponds to the specific limitation (S255: YES), in S256, determination is made as to whether print controlling data that corresponds to one page to be printed is received. When the print controlling data for one page is not received (S256: NO), the process repeats S252 through S255 until receiving the print controlling data for one page is completed. When the print controlling data for one page is received (S256: YES), the process proceeds to S257.

In S257, an image indicated by image data that is contained in the print controlling data for one page is printed by the image forming unit 23. Next, in S258, the page counter is incremented by 1. In S259, the maximum allowable number of sheets of recording paper for the name of the interface as the argument is obtained from the user access control list. Further, determination is made as to whether a current number in the page counter corresponds to the obtained maximum allowable number. When the current page number does not correspond, i.e., the number of pages to be printed in a current job is less than the maximum allowable number (S259: NO), the process returns to S252 so that a next page is printed. When the current page number corresponds to the maximum allowable number, i.e., allowable pages to be printed are completed (S259: YES), the print program 13b is terminated through S260 and S261. The process returns to S21 shown in FIG. 9A wherein the printing program 13a for applications is in the ready state to await the terminal device 30a to be connected.

When an instruction to terminate the program is given, for example by shutting down the MFP 10, while the printing program 13a for applications is executed, the printing program 13a for applications is terminated after a predetermined process, such as a process to save a file.

It should be noted that in the present embodiment the description is limited to the usage of the printing function of the MFP 10 for an explanatory purpose. However, limiting the availability and the accessibility of the other functions equipped to the MFP 10, such as the facsimile transmission/reproduction function and the scanning function, may be similarly executed based on the interface to be accessed by the terminal device 30a, as the applications (for example, scan program 13e, facsimile transmission/reproduction program 13g) corresponding to the other functions are stored in the ROM 13 of the MFP 10. In such cases, the scan program 13e and the facsimile transmission/reproduction program 13g can be executed in a known scanning method and a known facsimile transmission/reproduction method. It should be noted that the access permission confirmation program 13c for applications stored in the ROM 13 is a sub-program to determine the accessibility of the terminal device 30a and does not depend on the function of the MFP 10 to be used. Therefore, the access permission confirmation program 13c for applications can be used as a sub-program to determine the accessibility in each application to use the function of the MFP 10, and thus can be shared by a plurality of the applications. Further, each of the terminal devices 30a, 30b, 40a, 40b stores the program for terminal devices (not shown) to execute the other functions of the MFP 10 other than the printing function in the HDD 104. The access permission confirmation program 104*f* in the HDD 104 is a sub-program to obtain permission to access the MFP 10 and does not depend on the function of the MFP 10 to be used. Therefore, the access permission confirmation program 104*f* for terminal devices can be used as a sub-program to determine the accessibility in each application to use the function of the MFP 10, and thus can be shared by a plurality of the programs for terminal devices.

Although exemplary embodiments of the invention have been described, those skilled in the art will appreciate that there are numerous variations and permutations of the controlling system that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the interface of the MFP 10 for connecting the MFP 10 with the networks may not be necessarily connected to the wired communication network 300 and the wireless communication network 400. As shown in FIG. 12, both I/Fs 18, 20 may be connected with different wired communication networks 300, 500. Further, a number of the interfaces may not be limited to two, but may be more than two. For another example, the spirit of the present invention may be applied to various types of terminal devices, that may not necessarily be electronic peripheral devices. In such a case, connection to a charged network may be limited by providing a specific interface.

What is claimed is:

1. A controlling system for an electronic peripheral device, comprising;
    an electronic peripheral device having a plurality of communication interfaces that are respectively connected with different communication networks, and having a plurality of functions;
    at least one terminal device connectable to one of the communication interfaces of the electronic peripheral device via one of the communication networks so that the terminal device can use at least one of the plurality of functions based on which communication interface an instruction from the terminal device is received through when the at least one of the plurality of functions is determined to be available;
    a function availability setting system, by which availability of at least one of the plurality of functions to the terminal device is set; and
    a function execution controlling system which controls execution of the at least one of the plurality of functions based on which communication interface the instruction is received through so that the availability of the at least one of the plurality of functions set by the function availability setting system is applied to the terminal device that issued the instruction.

2. The controlling system according to claim 1,
    wherein the function availability setting system allows the at least one of the plurality of functions be accessed by the at least one of the plurality of communication interfaces and used by the terminal device while the remainder of the plurality of functions is restricted from being accessed and used.

3. The controlling system according to claim 2,
    wherein the function availability setting system comprises a function availability configuration storage system, which stores information to specify the at least one of the plurality of functions to be allowed to the at least one of the plurality of communication interfaces as function availability configuration information, and
    wherein the function execution controlling system determines the at least one of the plurality of communication interfaces through which the instruction from the terminal device is received and reads the function availability configuration information corresponding to the at least one of the plurality of communication interfaces determined from the function availability configuration storage system to specify the at least one of the plurality of functions to be allowed to the at least one of the plurality of communication interfaces.

4. The controlling system according to claim 3,
    wherein the function availability setting system comprises:
    a communication interface selecting system to select the at least one of the plurality of communication interfaces of the terminal device to which the availability of the at least one of the plurality of functions is applied;
    a limited function selecting system to select at least one of the plurality of functions to be limited, and
    a storage controlling system to control identifying information of the at least one of the plurality of communication interfaces selected by the communication interface selecting system and identifying information of the at least one of the plurality of functions selected by the limited function selecting system by storing the two pieces of information associated with each other.

5. The controlling system according to claim 1, further comprising:
    an authentication system which authenticates a user of the at least one of the plurality of functions before the at least one of the plurality of functions determined to be available by the function availability setting system is used,
    wherein the function availability setting system is for setting the availability of the at least one of the plurality of functions individually on a user basis.

6. The controlling system according to claim 5, wherein the function availability setting system comprises an authentication requirement setting system, by which whether the authentication is required is set individually on a function basis when the at least one of the plurality of functions is selected to be limited by a limited function selecting system.

7. The controlling system according to claim 6, wherein the function execution controlling system comprises an available function display controlling system to display information indicating the at least one of the plurality of functions determined to be available on a display unit of the terminal device.

8. The controlling system according to claim 7,
    wherein the terminal device is provided with a function selecting system in which the at least one of the plurality of functions provided to the electronic peripheral device is selected by the user, and
    wherein a screen to allow the user to recognize the at least one of the plurality of functions determined to be available to the terminal device is displayed on the display unit of the terminal device when the at least one of the plurality of functions is selected.

9. The controlling system according to claim 1,
    wherein the plurality of communication interfaces comprise a wireless communication interface and a wired communication interface, and wherein the terminal device connected with the wireless communication interface has the availability of the at least one of the plurality of functions.

10. The controlling system according to claim 1,
wherein the electronic peripheral device is a multifunction printing apparatus having at least an image printing function and an image scanning function, and
wherein the image printing function is the at least one of the plurality of functions.

11. The controlling system according to claim 10,
wherein the image printing function comprises a color printing function and a monochrome printing function, and
wherein the image printing function is the at least one of the plurality of functions.

12. The controlling system according to claim 10,
wherein the multifunction printing apparatus comprises a facsimile transmission and reproduction function, and
wherein the facsimile transmission and reproduction function is the at least one of the plurality of functions.

13. A computer usable medium comprising computer readable instructions for controlling an electronic peripheral device having a plurality of communication interfaces that are respectively connected with different communication networks and having a plurality of functions and at least one terminal device connectable to one of the communication interfaces of the electronic peripheral device via one of the communication networks so that the terminal device can use at least one of the plurality of functions based on which communication interface an instruction from the terminal device is received through when the at least one of the plurality of functions is determined to be available to execute the steps of:
function availability setting, wherein availability of at least one of the plurality of functions to the terminal device being connectable with the at least one of the plurality of communication interfaces is set; and
function execution control, wherein execution of the at least one of the plurality of functions is controlled based on which communication interface the instruction is received through so that the availability of the at least one of the plurality of functions set by the function availability setting system is applied to the terminal device that issued the instruction.

14. An electronic peripheral device comprising:
a plurality of functions;
a plurality of communication interfaces that are respectively connected with different communication networks;
a function availability setting system, by which availability of at least one of the plurality of functions to a terminal device is set;
an interface judging system, which judges to determine one of the plurality of communication interfaces that is connected with the terminal device;
a receiver system, which receives an instruction sent from the terminal device to the electronic peripheral device to execute one of the plurality of functions;
a function execution controlling system, which controls execution of one of the plurality of functions based on which communication interface the instruction is received through so that the availability of the one of the plurality of functions set by the function availability setting system is applied to the terminal device that sent the instruction.

15. The electronic peripheral device according to claim 14,
wherein the plurality of communication interfaces comprise a wireless communication interface and a wired communication interface, and
wherein the function availability setting system restricts availability of at least one of the plurality of functions to the wireless communication interface.

16. The electronic peripheral device according to claim 15,
wherein the plurality of functions comprise color printing function and monochrome printing function, and
wherein the function availability setting system restricts availability of the color printing function.

* * * * *